RAYMOND ARNOLD
INVENTOR.

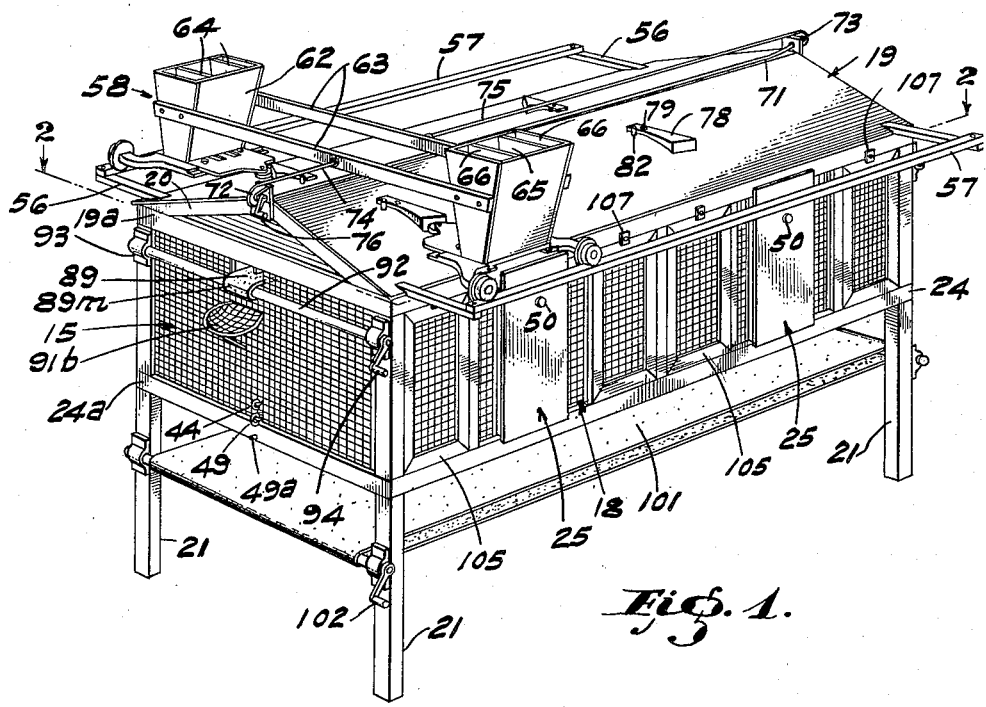
Fig. 1.
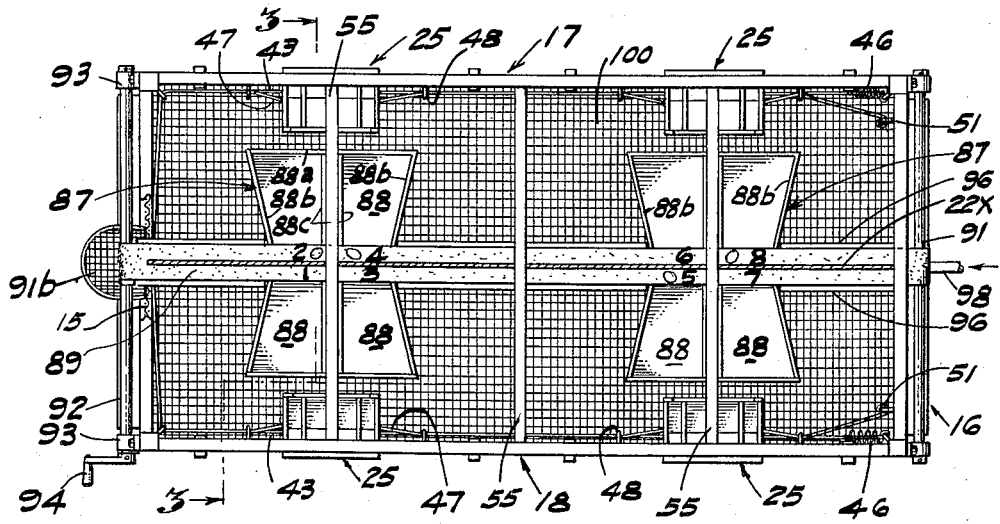
Fig. 2.
RAYMOND ARNOLD
INVENTOR.
BY 
ATTORNEY Jan. 2, 1951 — R. ARNOLD — 2,536,621
FEEDING APPARATUS FOR FOWL
Filed May 24, 1948 — 4 Sheets-Sheet 3

Jan. 2, 1951 — R. ARNOLD — 2,536,621
FEEDING APPARATUS FOR FOWL
Filed May 24, 1948 — 4 Sheets-Sheet 4

RAYMOND ARNOLD,
INVENTOR.

BY
ATTORNEY

Patented Jan. 2, 1951

2,536,621

UNITED STATES PATENT OFFICE 2,536,621

FEEDING APPARATUS FOR FOWL

Raymond Arnold, Los Angeles, Calif.

Application May 24, 1948, Serial No. 28,875

11 Claims. (Cl. 119—51)

This invention relates to a hen housing structure having separate apartments for individual hens, each of said apartments being equipped with a nest and supplied with water and all having a common feed supply means.

Various labor saving devices have been devised for supplying feed to fowls in confinement, but there remains room for improving upon such devices by providing for more conveniently supplying feed to a multiplicity of fowl apartments joined together in a single battery or housing assembly.

Accordingly, it is an important object of the present invention to improve fowl feeding apparatus in the particular above indicated.

Another object is to provide, in a multiple apartment laying house, improved means for mechanically conveying to a single point all the eggs of the hens housed in the apparatus, this being done in such a manner that the eggs of each hen can be identified, and she be credited on a laying sheet for her production.

Another object is to provide superior feed-conveying means mounted upon an elongated housing structure subdivided into apartments for individual fowls, and capable of being either manually or mechanically propelled therealong to distribute feed rapidly to feed troughs in each of said apartments.

Other objects, advantages and features of invention will hereinafter appear.

Referring to the accompanying drawings, which illustrate a preferred embodiment of the invention:

Fig. 1 is a perspective view of the complete apparatus.

Fig. 2 is a horizontal section on line 2—2 of Fig. 1.

Fig. 9 is a perspective view looking at the inner side of one of the combined feeding hoppers and feed troughs.

Fig. 10 is a partly elevational and partly sectional view of the hopper structure of Fig. 9, the viewpoint of the observer being indicated by angular line 10—10 of the latter view. An intermediate portion of the structure is broken out to lessen the height of the view.

Figure 3:
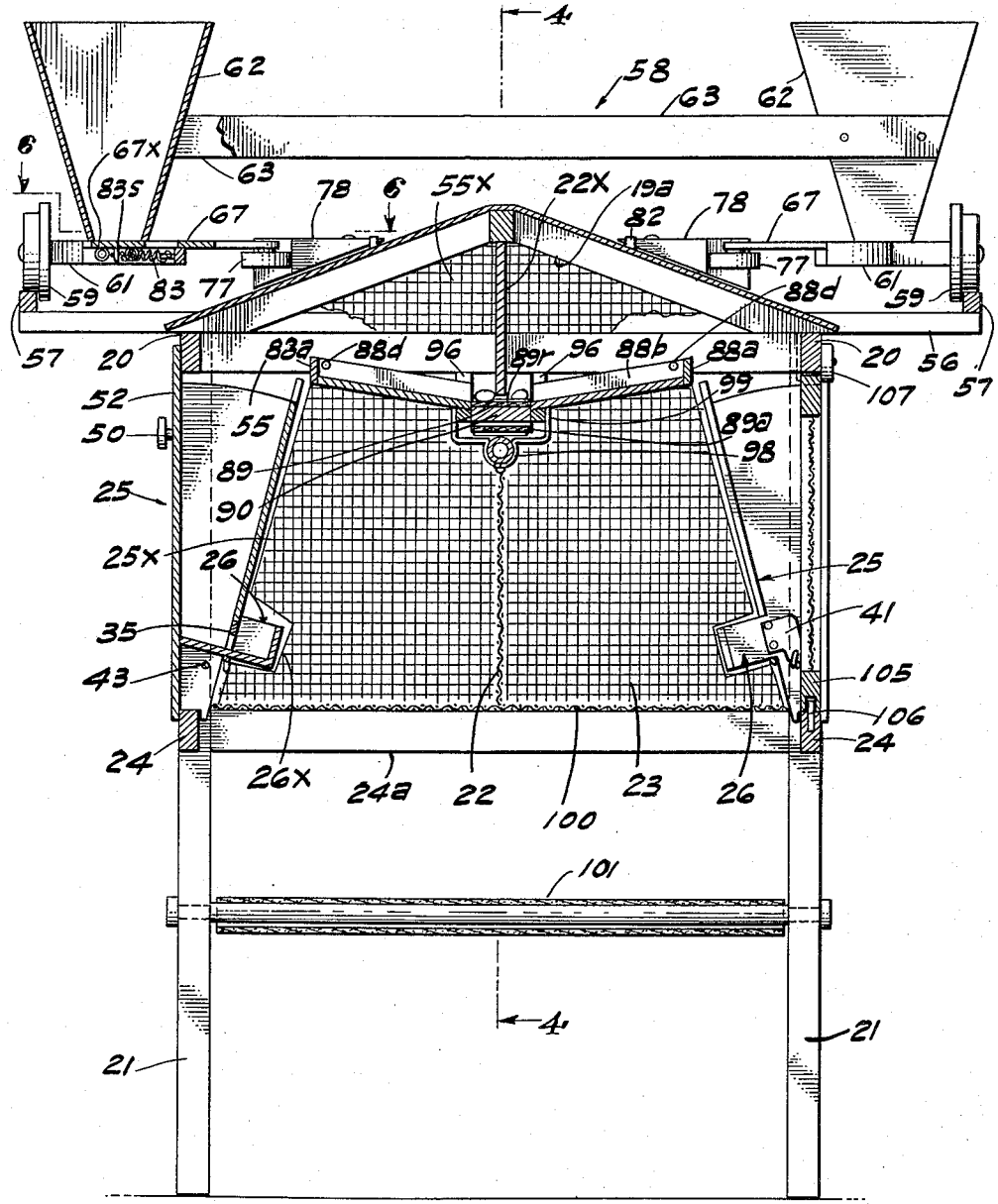
Fig. 3 is a cross section on line 3—3 of Fig. 2.

Referring in detail to the drawings, and first more particularly to Fig. 1, the elongated housing structure shown comprises end walls 15 and 16, side walls 17 and 18 and a V-type roof 19 supported by rafters 19a the outer ends of which rest upon girders 20. The main structure is rectangular as viewed in plan and is supported at each corner by a leg 21.

Figure 4:
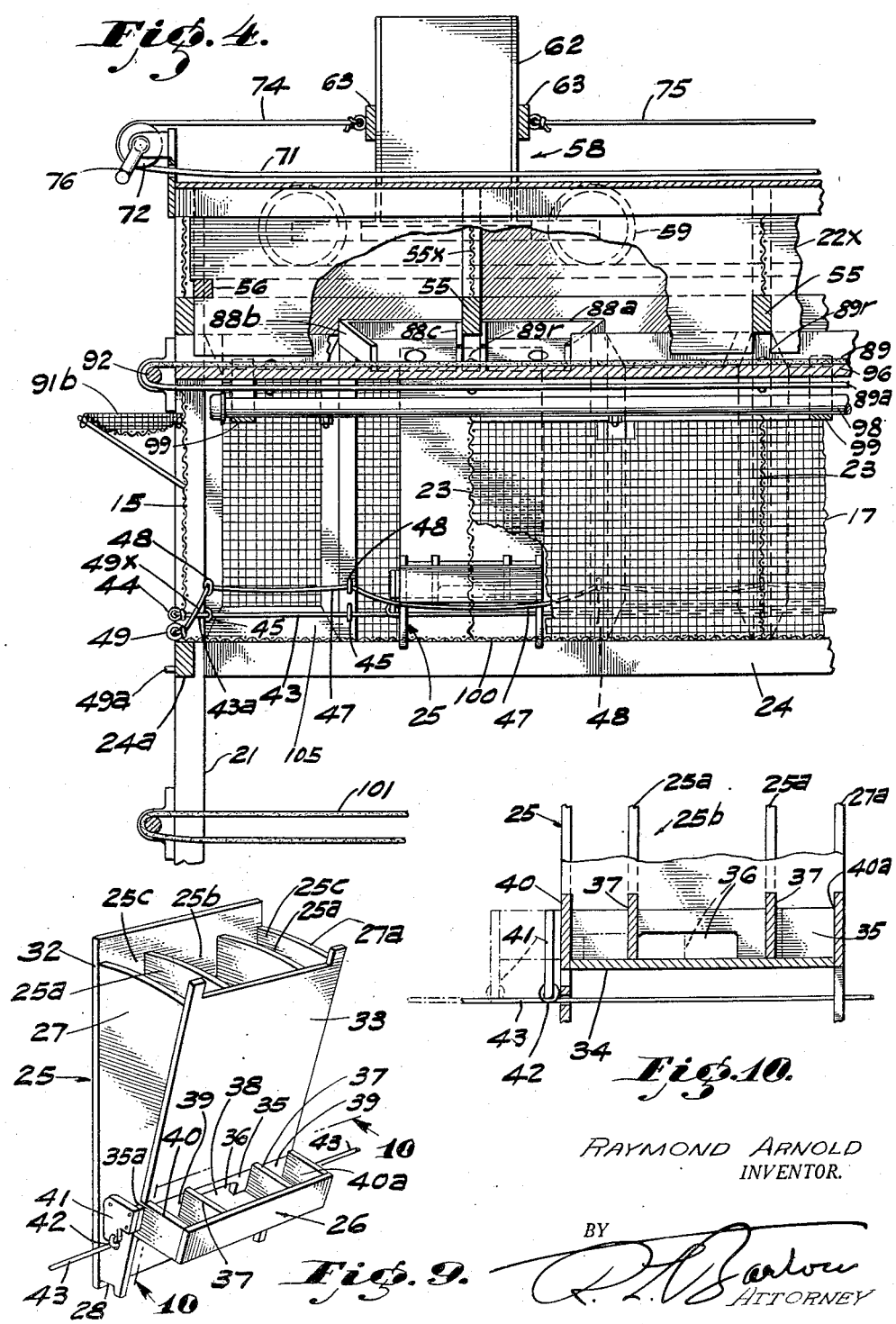
Fig. 4 is a longitudinal midsection on line 4—4 of Fig. 3, a centrally located overhead water supply pipe being shown in elevation.

In the illustrated embodiment of the invention eight apartments are partitioned off from each other in two rows of four each extending lengthwise of the structure, said two rows being separated by a midwidth reticulated wire partition 22, intersecting wire cross partitions 23 (two shown in Fig. 4) cooperating with said partition 22 to form said eight apartments, so far as interior subdivision is concerned, each of said apartments having an outside wall formed by a part of one or the other of aforesaid outside walls 17 and 18. The floor is supported by longitudinal beams 24 and cross beams 24a.

A feed supply device is provided along each side of the general assembly which is duplicative of that at the opposite side. Each of these twin devices comprise a series of feed hoppers 25, mounted in openings in the aforesaid outer side walls 17 and 18, a feed trough 26 being carried by the lower end portion of each of said hoppers, each hopper with its said feed trough being positioned to supply feed to two of the aforesaid eight apartments, ordinarily to feed a single hen in each apartment. Alternate partitions of the transverse partitions 23 come opposite to the aforesaid feed trough carrying hoppers 25 and, in order to clear the way for the inswing of the hoppers and appended troughs the transverse partitions are cut away at 25x opposite to said hoppers and at 26x opposite to said troughs, as shown in Fig. 5.

Figure 5:
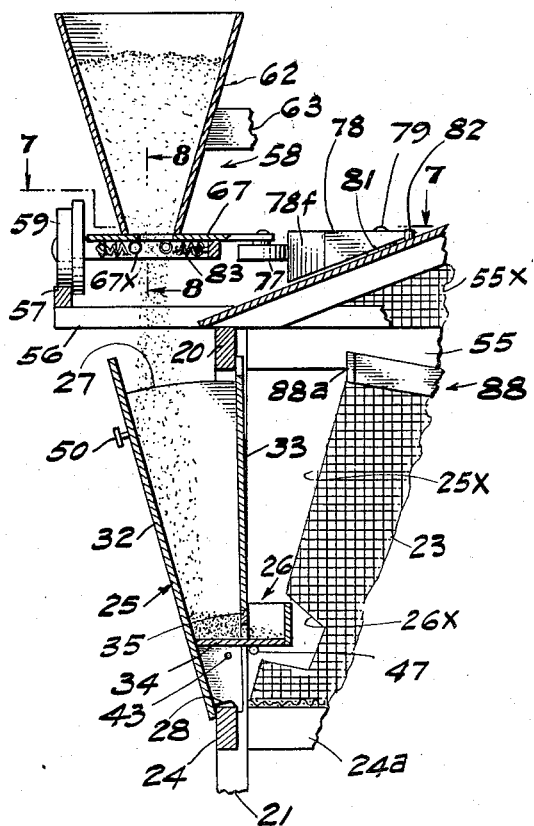
Fig. 5 is a fragmentary view of the left hand portion of Fig. 3, the feed hopper being shown in its outswung position as feed is delivered to it from the overhead feed carrier.
Figure 6:
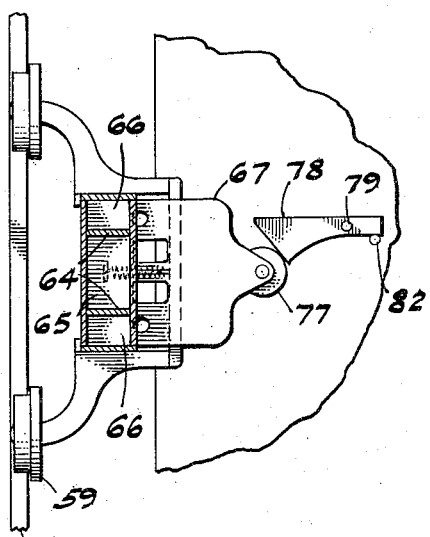
Fig. 6 is a fragmentary plan view taken on lines 6—6 of Fig. 3.
Figure 7:
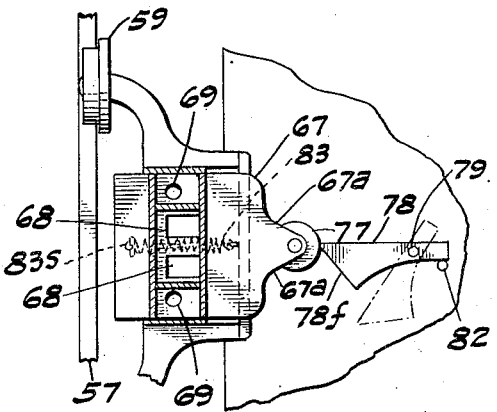
Fig. 7 is a reproduction of a portion of Fig. 6 showing the cam which operates the feed valve of the feed conveyor or carrier in an additional operative position.

Said hoppers 25 have twin end wall members 27, 27a with rectangular notches 28 in their lower ends which rest upon the horizontal sills 24 thus tiltably mounting each of said hoppers to swing from the inward position of Fig. 3 out to the position of Fig. 5, and vice versa. The swing of these hoppers is limited by the roof girders 20, inwardly against which swings the outer hopper wall 32 and outwardly against which swings the inner hopper wall 33. Said hoppers 25 each have two vertical internal partitions 25a dividing it into a central mash compartment 25b and twin end compartments 25c for grain.

Returning to the feed trough 26, a horizontal, imperforate plate 34 forms the bottom of both the hopper and trough carried thereby. The lower edge portion of the inner wall 33 of the hopper terminates slightly below the top of the trough 26, thus leaving an unobstructed feed passage between the hopper and trough were it not that a slide valve 35 is provided to occupy said passage. In the midlength part of said valve is a spacious rectangular mash port 36 leading from the aforesaid mash compartment 25b. Said trough 26 has in it two transverse partitions 37 which subdivide it into a central compartment 38 to receive mash from the mash compartment 25b of the hopper 25 and twin end compartments 39 for grain from the grain compartments 25c of the hopper, when said slide valve is operated. This trough structure is completed by end walls 40 and 40a. In order to provide operating clearances for the end portions of said slide valve 35, suitable slots are provided in the wall 27 at 35a and at the junctures of the partitions 37 with the partitions 25a. To that end of said slide valve which appears in Fig. 9 is secured an operating ear 41 with an apertured lower end portion through which passes a loop 42 in the valve operating wire 43. Said wire passes through the lower part of each hopper 25 of the row of hoppers at the same side of the structure. Each wire 43 has a front end run 43a, said runs being connected at the front end of the apparatus by a pull ring 44. Eyes 45 support these wires at suitable points. When the operator pulls said wires both forwardly by means of said ring 44 he shifts all the aforesaid slide valves to the position shown in dotted lines in Fig. 10 wherein one end portion of the port 36 admits grain to the grain compartments nearest to the operator, and also grain is admitted to the other grain compartments because of the in-drawn position of the slide 35 (see right hand portion of Fig. 10). This movement of the wires is opposed by springs 46 (see Fig. 2) at the end of the apparatus farthest from the operator, and when he releases his pull said springs restore all the slide valves to normal position, in which the grain supply is cut off, but the mash supply remains open.

Operating wires 47 are provided simultaneously to swing outwardly all the hoppers 25 of each row, these wires being led through suitable guide eyes 48. These wires are shown simultaneously operable by a pull ring 49, carried centrally by a wire run 49x which unites the front ends of said wires 47, their rear ends being anchored at 51. Adjacent to each hopper 25 said guide eyes 48 are positioned to maintain portions of these wires at higher levels than the bottoms of the feed troughs 26 under which they run, so that tightening these wires will apply upward pressures under said feed troughs, thus tending to swing outwardly the hoppers 25 by which said feed troughs are carried. It will be observed that, in relation to the general housing structure, the wire runs under the feed troughs are located inwardly of the centers of gravity upon which said hoppers tilt. Gravity will normally maintain each hopper in its inswung position, the weight of the trough 26 carried thereby, and of the feed in said trough contributing to this result. When the operator pulls each hopper-swinging wire taut he will place said operating ring 49 around an anchor pin 49a provided for it at the center of the front end of the apparatus, so that said wires will maintain all the hoppers which they engage in their outswung positions until the wire is relaxed to allow gravity to restore them to their normal positions. Each hopper 25 is shown provided with a knob 50 carried by its outer wall 32 and operable manually to outswing said hopper, if that becomes necessary.

In addition to the regular roof beams 55, at least two horizontal cross bars 56 extend through the roof. These have projecting end portions which support a horizontal track rail 57 outwardly adjacent to each side of the apparatus. Along these rails travels a feed carrier or carriage 58 comprising two pairs of track wheels 59, twin chassis frames 61 and the twin upper, hopper-like feed containers 62 supported by said chassis frames, said containers being secured together by a pair of cross-pieces 63 secured to their opposite sides, this arrangement being possible because of the fact that the hoppers 25 project considerably above the roof of the housing.

Figure 8:
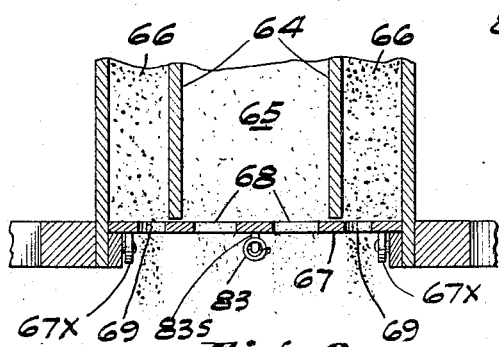
Fig. 8 is a vertical section on line 8—8 of Fig. 5.

Each of said containers 62 has within it two vertical partition plates 64 (Figs. 1 and 8), which subdivide it into a central compartment 65 for mash and twin end compartments 66 for grain. The otherwise open lower end of said container is normally closed by a horizontal slide valve 67 supported by antifriction rollers 67x and moveable toward and from the midwidth of the apparatus. Said slide valve has through it four ports in a row that extend transversely of the direction in which the valve reciprocates. In this row are twin middle ports 68 to deliver mash from said mash compartment and the two twin end ports 69 each of which is movable under an aforesaid grain compartment 66.

The aforesaid supply carrier 58 for the grain and mash is moved back and forth along the track provided therefor by means of a flexible cord or rope 71 which passes around pulleys 72 and 73 respectively mounted upon the front and rear end of the gable of the roof. Said rope has an upper front run 74 fastened to the midlength part of the front cross-piece 63 of the feed carriage, and an upper rear run 75 attached to the midlength part of the rear cross-piece 63 of said carriage. Said pulley 72 is operable by means of a crank 76, which enables the operator to move the carriage in either direction. It is to be understood that a reversible electric motor may be used to operate said carriage, and may be regulated to cause the carriage to travel at the desired speed.

In order automatically to operate the aforesaid feed valves 67, each of these two slide valves is provided with an extension 67a which carries an anti-friction wheel or disk 77 positioned to be acted upon by cams 78 which are swingable upon pivots 79, spacing washers 81 underlying these cams around their pivots. Stop pins 82, upstanding from the roof, limit the swing of said cams and thus cause them so to act upon the aforesaid wheels 77 as to open the slide valve 67 of each container 62 as it is moved rearwardly. In order to assist gravity to control their movements, said cams are made wedge shaped with thickened, broadened ends normally directed downwardly of the roof. Said stop pins 82 cause the cam faces 78f of the cams to force the slide valves 67 out to open positions and maintain them open for short periods when the containers are moved rearwardly, but there is nothing to prevent said cams from swinging inoperatively out of the way when said containers 62 are moved forwardly. Each of said slide valves 67 is provided with a retracting spring 83 connected thereto by an eye-carrying screw 83s.

Two four-part, overhead nest structures 87 are provided in the illustrated embodiment of the invention, each of said nest structures being located at the intersection of four apartment partitions so as to serve four hens. Each quadruplex nest structure 87 comprises four shallow trays 88, two at each side of a vertical dividing panel 22x, and two at each side of one of the cross beams 55 of the roof together with an overhead section 55x of a chicken wire partition, the lower edge of which extends down to said cross beam and the upper edge of which extends to the roof. Each of said nest trays is inclined, having an open lower side positioned to allow eggs laid in such tray to roll down onto the adjacent side portion of the upper run 89 of an endless egg conveying belt that extends lengthwise of the apparatus. Opposite to its said open side each egg tray is provided with an upstanding marginal guard strip or rail 88a which is joined at each nest tray, at one end by a marginal guard strip 88b, which is laterally inclined in such a manner as to narrow somewhat the lower, egg outlet, end of the tray of which it forms a part. Also, at each side of the egg-conveying belt, where two nest trays come adjacent to each other, each tray has a guard strip 88c, the upper end portions of the latter guard strips abutting against opposite sides of the aforementioned cross beam 55 which intersects the quadruplex nest structure at that point. Said guard strips 88c are secured to said cross beams by fasteners 88d.

Said upper run 89 of the egg-conveying belt overlies a beam 90 extending along the midwidth of the housing structure, said belt having a lower run 89a below said beam. At one end of the housing structure said belt passes around an idle shaft 91 and at the opposite end thereof it passes around the midlength part of a drive shaft 92, carried by bearing 93 and operable by a crank 94 located at a front corner of the apparatus. An egg-receiving basket 91b is mounted in a position to receive the eggs from said belt run 89, or 89a. Also guard rails 96 are provided alongside the belt run 89 to insure that the eggs safely reach the egg basket 91b. Said guard rails 96 are provided in their upper edges with broad cut-outs opposite to each quadruplex nest structure, said nest structure being fitted into said cut-outs. These rails 96 are secured both to the beams 55 and 90. Transverse ribs 89r are carried by the belt to maintain the eggs in their numbered relations, hereinafter specified.

Each individual egg-receiving part of the egg-conducting belt has inscribed upon it numerals, "1," "2," etc. through "8" (see Fig. 2) which serve to identify the eggs of individual hens as said eggs approach the egg basket 91b. The aforesaid vertical, partition-forming panel 22x is positioned superjacent to the midwidth of said belt and prevents egg laid at one side of said partition from becoming confused with those laid on the opposite side thereof. It is to be understood that the belt will be given a one-half revolution each time that the eggs are collected and that the lower run 89a thereof will have a duplicate set of nest-identifying numerals inscribed upon it. The belt is provided at each end with a mark 89m, as indicated in Fig. 1 to enable the operator properly to position the belt runs. It will be seen that the partition structure which runs along the midwidth of the main housing structure is divided into an upper section formed by the aforementioned panel 22x that keeps eggs laid on one side portion of the belt from mingling with those laid on the opposite side portion thereof; and a lower partition section formed by the aforementioned fencing wire 22. These partition sections cooperate as to nest divisions with the already mentioned transverse lower partition sections 23 and upper transverse partition sections 55x.

A conventional overhead "dew drop" water supply pipe 98 is shown suspended by a hanger means 99 at the midwidth of the apparatus in such a position that it supplies water to all the fowls. Said pipe 98 may be connected to a city water supply system.

The floor 100 of the apparatus is shown as consisting of a wire netting through which the droppings and other refuse can fall upon the conventional endless manure conveyor 101 shown therebelow operable by a crank 102 at a front corner of the main structure.

The longitudinal outside walls of the main structure have screen carrying door sections 105 the lower ends of which are grooved each to straddle in a tiltable manner a retaining strip 106 seated in a vertical groove provided for it along the upper side of the subjacent floor beam 24. Buttons 107 carried by the girders 20 serve to lock said door sections in their inswung positions. These door sections are completely removable, which not only facilitates putting fowls in and removing them, but also affords convenient access to the interior of each apartment to clean and sterilize it.

The operation of the apparatus will for the most part be readily understood from the foregoing description, but the following additional points should be noted. Before operating the crank 76 to reciprocate the feed carriage the attendant will draw the wires 47 taut, thus outswinging all the hoppers 25, and then he will place the wire operating ring 49 over the pin 49a temporarily to hold said hoppers outswung. In operating said crank 76 (see left end of Fig. 1), to reciprocate the feed containers 62 lengthwise of the apparatus, the attendant will learn by practice the proper speed at which said containers should be moved toward the rear end of the apparatus to cause them to deliver the proper amounts of feed to each of the subjacent hoppers 32 (see Fig. 5) as said containers pass said hoppers. This movement should be at a speed which will allow each cam 78 to hold open the slide valve 67 passing it long enough to supply the proper dole of feed to said hopper. If this movement is too fast, an insufficient dole of feed will be supplied; if too slow, too much feed will pass through said valve. But the return movement of the hopper-carrying carriage may be made as quickly as desired, because the cams 78 are inoperative during such movement. It will be seen that, in each instance, a single feeding unit comprising a feed box 26 and its supply hopper 25 suffices for two adjacent fowl-housing apartments or cages. The combined capacities of said feed box and hopper supply enough mash and grain for one week. The mash is kept continually before the hens, but the grain (frequently corn) is fed but once a day by pulling forwardly each of the wires 43 and momentarily holding them forwardly pulled, by their ring 44, against the opposition of their retracting springs 45. This arrangement saves the operator from going from cage to cage to where individual hens are confined, and putting the feed into the aforesaid troughs by hand.

The operation of the egg-conveying belt by means of the crank 94 needs but little further explanation. Owing to the eggs in the nests being well shaded they need be collected but once a day. The operator will stand at the front end of the machine and will check the eggs on his record sheet to accord with the numbers on the belt run of the hens that lay them.

While it is deemed preferable that the row of feed hoppers 25 be made inwardly swingable so that their upper ends are not normally open to the weather, yet it is not essential to the successful operation of the apparatus that they be so constructed, for they may remain in their outswung positions and yet the mash and grain will be dependably fed to the back portions of the feed troughs 26 where they can be reached by the fowls.

From Fig. 5 it will be observed that the center of gravity of the hopper 25 is at the outer side of its bottom notch 28, thus facilitating the gravitational inswing of the hopper when the wire 47 is slackened.

I claim:

1. In a hen housing structure, an outside wall, spaced apart feed hoppers extending in a row along said wall, a feed receptacle for each of said hoppers to which it delivers feed interiorly of said wall, a track carried by said structure, a feed carrier propellable along said track and positioned to deliver feed individually to said hoppers while moving opposite to such hopper, said feed carrier comprising a container having a feed outlet and a valve which controls delivery of feed through said outlet, a spring mounted upon said carrier normally holding said valve closed, and valve operating means mounted on said structure and positioned to open said valve automatically and hold it open only during the time said feed carrier is traveling opposite to one of said hoppers when moved in one direction along said track.

2. The subject matter of claim 1, and said valve being cam-operable, and operating means therefor comprising cams mounted upon said structure at points opposite to the location of said hoppers.

3. In a hen housing structure, an outside wall, a feed hopper positioned to receive feed outside said wall, said hopper being divided by vertical partitions into a central compartment and two end compartments, a feed receptacle internally adjacent to said wall, said receptacle having a middle compartment positioned to receive feed from said middle compartment of said hopper and end compartments positioned to receive feed from said end compartments of said hopper, and an internal partition separating adjacent compartments within said housing structure along a line which bisects the middle compartment of said middle feed receptacle.

4. In a hen housing structure, an outside wall, spaced apart hoppers extending in a row along said wall, a feed receptacle for each of said hoppers to which it delivers feed interiorly of said wall, a track carried by said housing structure, a feed carrier propellable along said track and positioned to deliver feed individually to said hoppers while moving opposite to such hopper, said feed carrier comprising a container having a feed outlet and a cam-operable slide valve movable transversely in relation to said outside wall to open and close said outlet, a spring connected to said valve and normally holding it closed, said spring tending to move said valve toward the inner side of said outside wall, and a cam mounted on said housing structure in a position to open said valve automatically and maintain it open against the opposition of said spring to deliver the required amount of feed each time said feed carrier moves along the part of its track opposite to one of said hoppers during its travel in one direction.

5. The subject matter of claim 4, and said cams being swingable, and stop means on said housing constructed and arranged to cause them to operate said valves when said carrier moves in said one direction and to leave them free to swing to inert positions when said carrier moves in the opposite direction.

6. In a hen housing structure, two parallel outside walls, spaced apart hoppers extending in a row along each of said walls, a feed receptacle for each of said hoppers to which it delivers feed interiorly of the wall by which it is stationed, a track carried by said housing structure and comprising two rails, each of said rails extending along one or the other of said outside walls, a feed carrier propellable along said track, said feed carrier comprising two feed containers positioned opposite to each other and so that when one of said containers is positioned to deliver feed to an aforesaid hopper adjacent to one of said outside walls the other of said containers is positioned to deliver feed to an aforesaid hopper adjacent to the other of said outside walls, a slide valve controlling feed delivery from each of said two containers of said carrier, a spring connected with each of said slide valves and tending to move it toward the midwidth of the housing structure to closed position, and cams mounted on said housing structure and positioned to open said slide valves by simultaneously moving them away from each other at the times when said containers of the carrier are moved in one direction to positions for delivering the feed to two aforesaid opposite hoppers.

7. In a structure of the kind described having two parallel outside walls and a roof extending from end to end thereof, a track carried by said roof and comprising two rails, each of said rails extending along one or the other of said outside walls, a carriage comprising a frame and two pairs of track wheels, one pair of said wheels traveling along one of said rails and the other pair of said wheels traveling along the other of said rails, two hopper-like feed supply containers carried by said carriage one adjacent to each of said track rails and projecting above said roof, said carriage including two basal portions, one at each end thereof, by which the lower portion of each of said feed supply containers is united to the pair of wheels at its end of the carriage structure, and a pair of crosspieces extending superjacent to said roof and from side to side thereof and connecting said hopper-like containers to each other at points above their lower ends, said crosspieces being secured to opposite outer sides of said containers, two rows of compartments within the general structure, said outside walls each forming an outside wall of each compartment of the row of compartments at its side of the structure, feed receptacles for each of said compartments accessible to the fowl therein, and means built into said outside walls to conduct feed from said supply containers of said carriage to said feed containers of said compartments at times when said carriage is in motion opposite to the compartments to be supplied from it.

8. In a structure of the kind described, an apartment for a hen, said apartment having an outside wall, an elongated feed trough the length of which extends horizontally and parallel to said wall, said trough being accessible to a hen in said apartment and having two transverse partitions across its interior which divide it into a central mash compartment and end compartments for grain, a feed supply hopper for said trough, said hopper being supplyable outside of said wall with feed and having in it two vertical partitions dividing it into a central mash compartment and a grain compartment at each end, the mash compartment of said trough being opposite the lower portion of said mash compartment of said hopper and the grain compartment of said trough being opposite to the lower portions of said grain compartments of said hopper, a slide valve positioned between the interior of said trough and the interior of said hopper and operable to control passage of feed from said grain compartments of said hopper to said grain compartments of said trough, there being a spacious opening through said valve to at all times admit mash from said mash compartment of said hopper to said mash compartment of said trough, a spring normally to hold said valve in a position at one end of its travel wherein it admits mash to said central compartment from said hopper while cutting off the grain supply therefrom to said grain compartments of said hopper, and an operating connection attached to said valve and extending along said outside wall to a point remote from said valve and operable to slide said valve in opposition to said spring to a position wherein said end compartments of said trough are open to the grain supply of said hopper.

9. In a structure of the kind described, an elongated housing subdivided by transverse partitions into a series of apartments for individual laying hens, a series of feeding devices stationed alongside said housing for individual said apartments therein and comprising hoppers to receive feed exteriorly of said housing and to deliver it within the individual apartments thereof, an elevated track supported by said housing and extending longitudinally thereof, a feed carrier mounted upon said track to travel therealong past said feeding devices, said carrier having a valve-trolled feed outlet positioned to deliver feed to the hopper of each said feeding devices as the carrier passes such device, valve operating means stationed on said housing automatically momentarily to open each of the valves controlling said feed outlets at the times when said carrier, when traveling in one direction, moves opposite to a said feeding device, to discharge a dole of feed to the latter, and means manually to reciprocate said feed carrier, said manually operable means being operable by a person stationed at the front end of the aforesaid elongated housing.

10. In a hen housing structure, an outside wall, a feed hopper positioned to receive feed outside said wall, said hopper being divided by vertical partitions into a central compartment and two end compartments, a feed receptacle internally adjacent to said wall, said receptacle having a middle compartment positioned to receive feed from said middle compartment of said hopper and end compartments positioned to receive feed from said end compartments of said hopper, an internal partition separating adjacent compartments within said housing structure along a line which passes through the central portion of the middle compartment of said middle feed receptacle, and a remotely operable slide valve mounted upon said hopper in a position to control the flow of feed therefrom from the end compartments of said hopper to the end compartments of said feed receptacle while at all times leaving unobstructed the flow of feed from the middle compartment of the hopper to the middle compartment of the feed receptacle.

11. In a hen housing structure, a roof having sloping side portions, an outside wall, spaced apart feed hoppers extending in a row along said wall, a feed receptacle for each of said hoppers to which it delivers feed interiorly of said wall, a track carried by said structure, a feed carrier propellable along said track and positioned to deliver feed individually to said hoppers while moving past them, cam operable valves mounted upon said carrier to deliver feed from said carrier to said feed receptacle, and gravity-controlled cams swingably mounted upon said sloping portions of said roof and provided with stops which cause them to open said valves when said carrier, while moving in one direction, passes each individual hopper of said feed hoppers, said stops allowing said cams to swing to inoperative positions when said carrier moves in the opposite direction.

RAYMOND ARNOLD.

REFERENCES CITED

The following references are of record in the file of this patent:

UNITED STATES PATENTS

| Number | Name | Date |
|---|---|---|
| 346,504 | Sears | Aug. 3, 1886 |
| 1,221,540 | Jones | Apr. 3, 1917 |
| 1,540,393 | Haack | June 12, 1925 |
| 1,837,528 | Burri | Dec. 22, 1931 |
| 1,911,633 | Lohrer | May 30, 1933 |
| 2,055,110 | Raymond | Sept. 22, 1936 |
| 2,068,566 | Olson et al. | Jan. 19, 1937 |
| 2,169,144 | Hawkins | Aug. 8, 1939 |
| 2,264,156 | Apple | Nov. 25, 1941 |
| 2,302,314 | Haggart | Nov. 17, 1942 |
| 2,339,043 | Armstrong | Jan. 11, 1944 |
| 2,369,316 | Scott | Feb. 13, 1945 |
| 2,436,095 | Brossia | Feb. 17, 1948 |